INVENTOR
Robert D. Lambert
BY Connolly and Hutz
ATTORNEYS

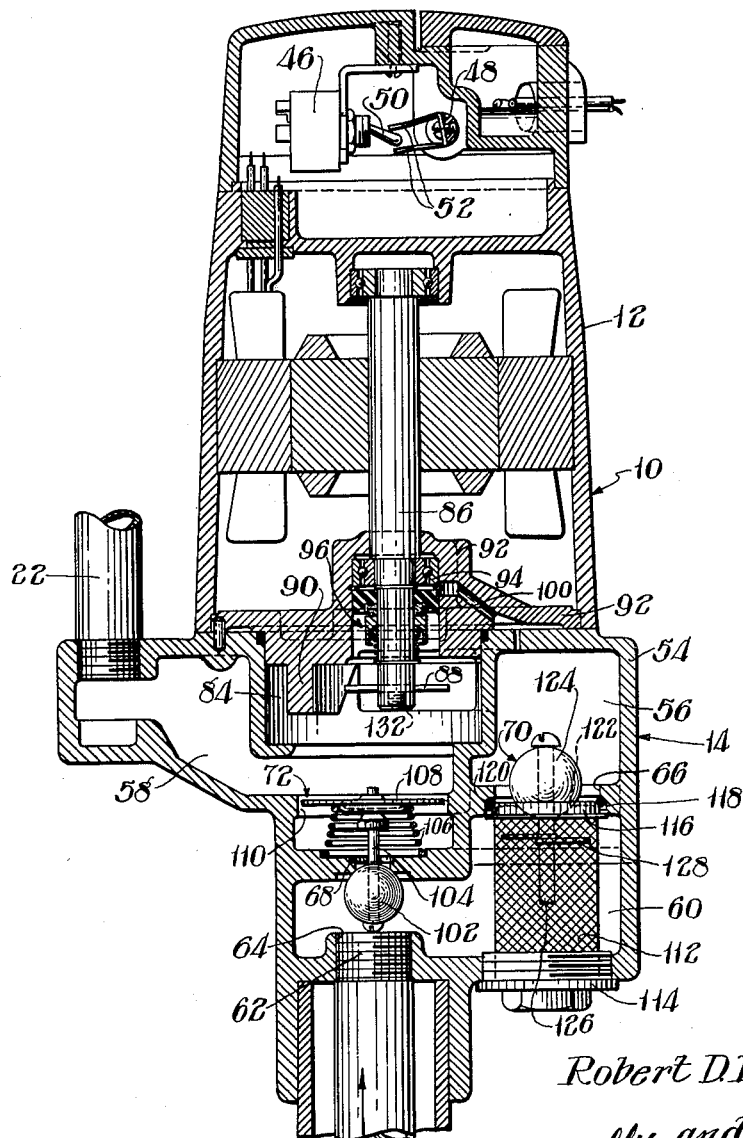

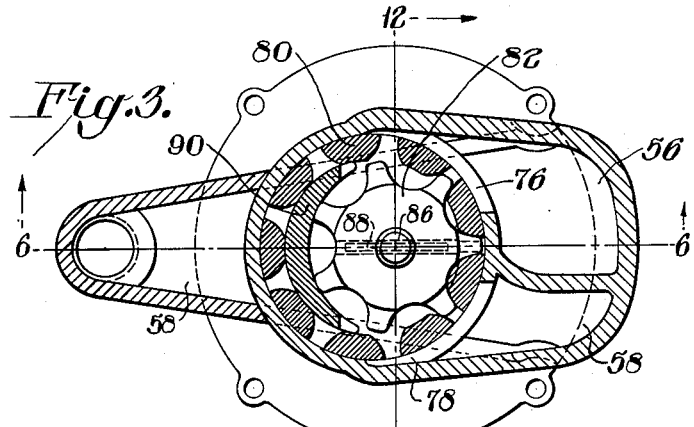
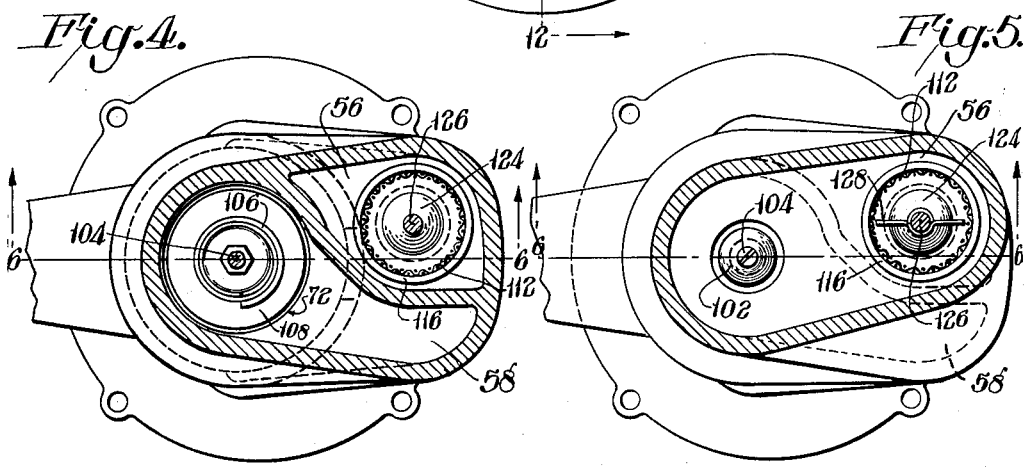
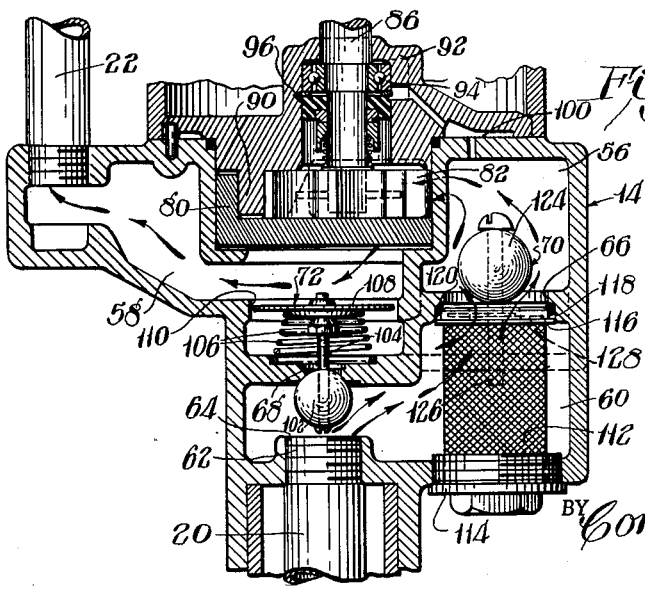

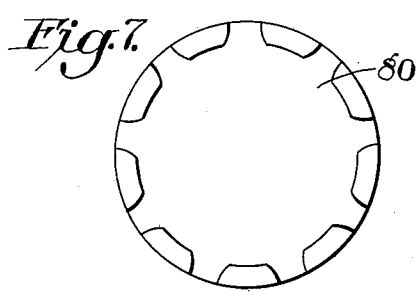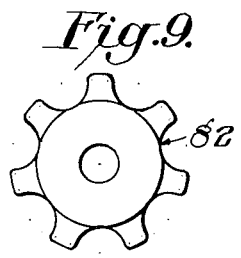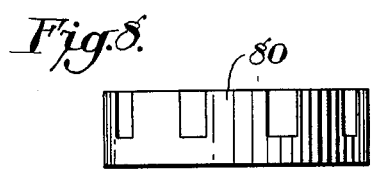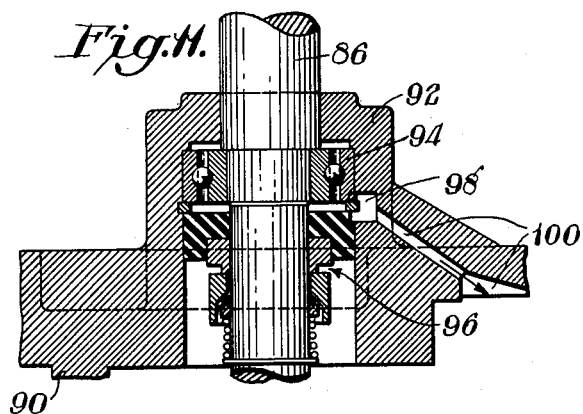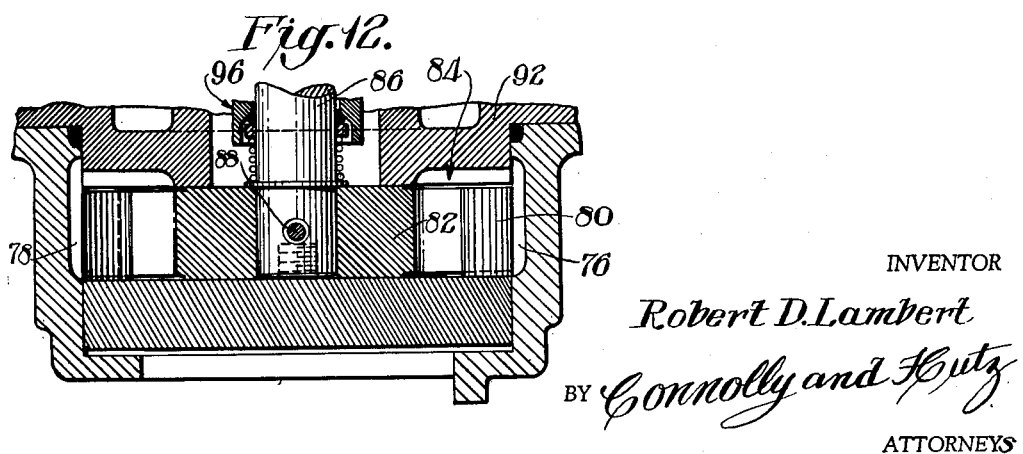

United States Patent Office 3,138,169
Patented June 23, 1964

3,138,169
VALVE ARRANGEMENT FOR PUMP
Robert D. Lambert, Fort Wayne, Ind., assignor to Symington Wayne Corporation, Salisbury, Md., a corporation of Maryland
Filed June 13, 1961, Ser. No. 116,720
6 Claims. (Cl. 137—108)

This invention relates to a relief and check valve arrangement for a rotary pump, and it more particularly relates to such an arrangement in which the relief valve is enclosed within the pump casing and is operative even when the discharge and check valves are closed.

Very many rotary positive displacement pumps incorporate relief valves in their discharge chambers which bypass to suction to minimize pressure build ups before the pump discharge is opened. However, since check or foot valves are usually installed in the suction lines, these relief valves are not capable of operating before pump rotation is commenced. Excess pressure protection before the discharge valve is opened is, therefore, usually provided by venting the relief valve externally. However, this complicates the installation and causes undue waste or danger if the liquid pumped is expensive or flammable.

An object of this invention is to provide a simple and dependable relief and check valve arrangement for a positive displacement pump which is capable of relieving any undue pressure while the pump is operating or shut off without externally venting the relief valve.

In accordance with this invention the suction inlet to the pump is connected to a bypass chamber which communicates with the suction and discharge chambers of the pump through check and relief ports respectively. A pressure relief valve relieving to the bypass chamber is installed within the relief port, and a check valve preventing back flow from the suction chamber is mounted within the check port. The resultant parallel connection of these valves permits any pressure built up in the discharge chamber to be relieved to the bypass chamber either when the pump is open and operating or closed. When the discharge is closed, the pressure relief valve relieves through the bypass chamber and suction inlet; and when the discharge valve is opened and liquid is being pumped, the relieved pressure is recirculated from the bypass chamber into the suction chamber.

A flow responsive surface can be mounted upon a portion of the relief valve extending within the discharge chamber for increasing the static pressure required to open the valve while there is flow through the discharge chamber. This permits a higher static pressure to be maintained in the discharge chamber during flow conditions, whereas the valve can relieve at lower pressures during shutoff to prevent unsafe buildup of pressure while the discharge is shut off. The flow responsive surface may conveniently be provided by a disc connected to the discharge valve stem which cooperates with a flow of fluid to supplement the valve-closing force of the relief valve spring.

A highly convenient form of check valve in such an arrangement can be provided by utilizing a removable cylindrical strainer having the check valve element connected to its inner end. The inner end of the strainer seats into the check port, and the entire unit may be removed when necessary through an access plug installed in a wall of the bypass chamber opposite the check port within which the outer end of the strainer is mounted. This valve and strainer assembly may utilize a rubber ball mounted upon a stem which is loosely secured to an apertured strainer cover by means of a spring clip.

Novel features and advantages of the present invention will become apparent to one skilled in the art from a reading of the following description in conjunction with the accompanying drawings wherein similar reference characters refer to similar parts and in which:

FIG. 2 is a cross-sectional view taken through the vertical axis of the embodiment shown in FIG. 1;

FIGS. 3–5 are cross sectional views taken through FIG. 1 along respectively indicated lines;

FIG. 6 is a cross-sectional view similar to the corresponding portions of FIG. 2 during the flow phase of operation;

FIGS. 7 and 8 are respectively plan and elevational views of the external gear element of the pump shown in FIG. 6;

FIGS. 9 and 10 are respectively plan and elevational views of the internal gear element of the pump shown in FIG. 6;

FIG. 11 is an enlarged cross-sectional view of the seal and bearing portions shown in FIG. 6; and FIG. 12 is a cross-sectional view taken through FIG. 1 in a different angular direction to that of FIG. 2.

Figure 1:
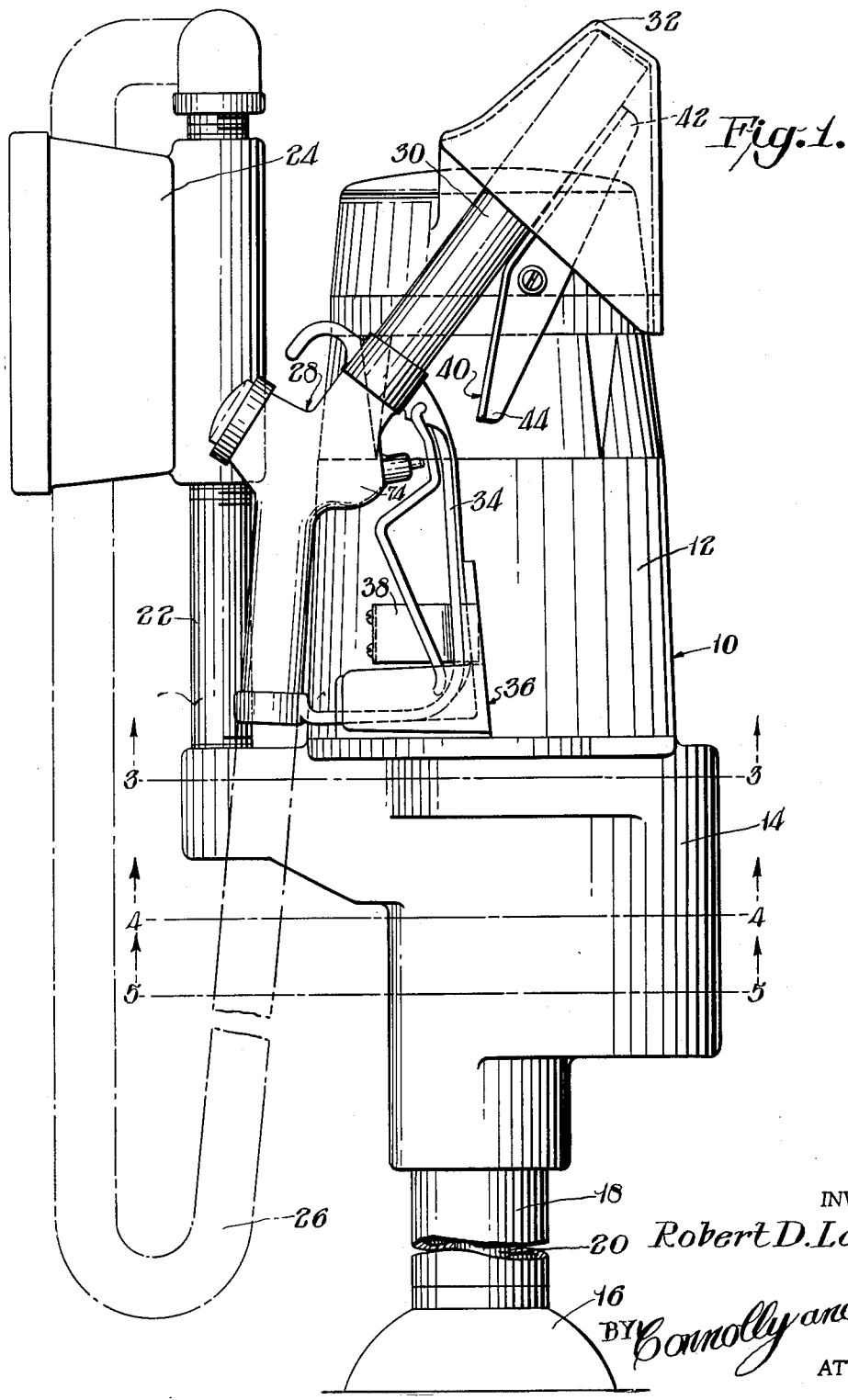
FIG. 1 is a front view in elevation of a motor pump assembly incorporating an embodiment of this invention.

In FIG. 1 is shown a motor-pump assembly 10 including an electric motor 12 and a pump 14 of the positive displacement type mounted upon a tank or reservoir 16 by means of a standpipe 18 through which a suction tube 20 extends.

Pump 14 discharges through pipe 22 and meter 24 into a flexible hose 26 at whose end is connected a nozzle 28. Nozzle 28 is stored upon motor 12 by insertion of its spout 30 within a boot 32 and insertion of its handle 34 within an open-ended pocket 36 within which it is resiliently secured by a spring retainer 38. A double-ended switch-operating lever 40 is rotatably mounted upon motor 12 with its inner end 42 inserted within boot 32 to provide just enough space in the "off" position to permit spout 30 to be inserted within boot 32. When spout 30 is removed, outer end 44 of lever 40 can be manually operated to turn motor switch 46 "on," as shown in FIG. 2, by corresponding rotation of switch-operating shaft 48 to actuate switch arm 50 through spring fingers 52 mounted upon shaft 48. Details of this motor switch operating and internal lock mechanism are described and claimed in commonly assigned copending application W–128A, S.N. 116,719 filed June 13, 1961. Lever 40 cannot be turned "on" while nozzle 28 is inserted within boot 32, and this makes it necessary to remove nozzle 28 before the pump motor is operated.

Details of this relief and check valve arrangement are shown in FIGS. 2–6, which illustrate the different portions of casing 54 of pump 14. Casing 54 accordingly includes suction chamber 56, discharge chamber 58 and bypass chamber 60. Upper end 62 of suction tube 20 is connected to bypass chamber 60 at casing inlet opening 64. Bypass chamber 60 communicates with section chamber 56 and discharge chamber 58 through check port 66 and relief port 68, which are respectively sealed by check valve 70 and relief valve 72. This parallel arrangement of check valve 70 and relief valve 72 to suction inlet 64 permits pressure to be relieved within the pump casing without any special relief piping even when discharge valve 74 upon nozzle 28, shown in FIG. 1, is closed and the pump is not rotating as is later described in detail.

The configuration of all parts of suction chamber 56 and discharge chamber 58 are described in FIGS. 3–6 and 12, and FIGS. 3 and 12 illustrate the configuration of suction port 76 and discharge port 78 through which respective chambers 56 and 58 are connected to the lower and higher pressure sides of positive displacement pump 14, which is for example of the internal gear type.

As illustrated in FIGS. 3, 6 and 7–12, pump 14 includes interengaged external and internal rotating gear elements 80 and 82 which are rotatably mounted with cavity 84, shown in FIG. 2, in a manner described in detail in commonly assigned copending application W-128C, S.N. 116,718 filed June 13, 1961 by this same inventor.

Internal geared element 82 is secured to motor shaft 86 by a spring pin 88, shown in FIGS. 2 and 3, and a crescent 90 extending from pump casing head 92 is inserted between it and external element 80 as shown in FIG. 11. Bearing 94 in pump casing head 92 simultaneously acts as a motor and the sole pump bearing, and it is sealed from the pumped fluid by a mechanical seal 96, which is also described in detail in aforementioned application W-128C. The annular collecting space 98 between bearing 94 and seal 96 is drained to pump suction chamber 56 through passageway 100, as shown in FIG. 11.

Pressure relief valve 72, shown in FIG. 2, includes a resilient valve element 102 made in the form of a rubber ball mounted upon stem 104. Compression spring 106 reacts between disc 108 at the end of stem 104 disposed within discharge chamber 58 to maintain ball 102 in sealing engagement with relief port 68. The stiffness of compression spring 106 is adjusted to permit the pressure in discharge chamber 58 to unseat ball 102 against its force when it rises above a predetermined static pressure, which is for example 5 p.s.i. when pump discharge valve 74 is closed. Disc 108, which is mounted within a circular passageway 110 adjacent discharge chamber 58, also acts as a flow responsive element which increases the static pressure necessary to open valve 72 while discharge valve 28 is open and fluid is flowing through discharge chamber 58. For reasons which are not completely understood, the flow across the surface of disc 108 raises the static relieving pressure during flow conditions to approximately 13 p.s.i. while a flow of from 10 to 15 g.p.m. is being pumped. Since the pressure drop through the entire assembly including hose 26 and nozzle 28 is less than 13 p.s.i., relief valve 72 will be maintained closed while the pump is delivering its full rated output. As previously mentioned when nozzle valve 74 is closed and the pump operated, flow responsive element is inoperative; and spring 106 allows valve 72 to start to relieve at 5 p.s.i., and its capacity prevents the pressure at nozzle shutoff within discharge chamber 58 from building up over 9 p.s.i. Valve 72 also starts to relieve at 5 p.s.i. even when the pump is not operating. This provides a positive means of preventing undue pressure build up within the pump casing even when all valves are closed.

As shown in FIGS. 2 and 4-6, check valve assembly 70 is made in a remarkably economical and convenient manner in combinaation with cylindrical strainer 112 which is made of metal screening. The outer end of strainer 112 is inserted within a hollow plug 114 which is screwed into a portion of the wall of bypass chamber 60 opposite check port 66. An annular cap 116 is fitted over the inner end of strainer 112, and it is inserted into recess 118 adjacent check port 66 and sealed therewithin by O-ring 120. The central hole 122 in cap 116 provides a seat for resilient ball check 124 made, for example, of rubber. Ball check 124 is mounted upon stem 126, whose inner end is secured within cap 116 by spring clip 128 which fits within a groove (not shown) in stem 126. This provides a remarkably simple and easily removable strainer and check valve assembly.

*Operation*

In operating the apparatus shown in FIG. 1, nozzle 28 is removed from boot 32 and pocket 36, and motor 12 is started by manually rotating lever 44 into the position vacated by spout 30. This flips arm 50 of switch 46 to the "on" position, which starts motor 12 to rotate pump 14 before nozzle valve 72 is opened. Positive displacement pump 14 in this closed discharge condition builds up a pressure in discharge chamber 58 above that required to overcome the force of relief valve spring 106 thereby opening relief valve 72 to relieve the pressure into bypass chamber 60. This flow into bypass chamber 60 is recirculated through check valve 70 into suction port 76 and back through the pump which minimizes load imposed upon the motor during this shut off condition. Relief valve 72 has sufficient capacity to prevent a pressure build up in chamber above 9 p.s.i. during this shut off condition. The opening force upon relief valve 72 opposed by spring 106 is exerted on the portion of ball 102 exposed to pressure chamber 58 through relief port 68 and not upon disc 108 because the pressure on both sides of disc 108 can equalize through the generous clearance between its edge and the inside of passageway 110.

Valve 72 can also relieve through suction inlet 64 under closed non-pumping conditions because relief valve 72 is in parallel with check valve 70, which protects the discharge system from pressures built up for any reason whatsoever, such as expansion of trapped fluid when the ambient temperature rises.

When nozzle valve 74 is opened to discharge fluid through spout 30, the flow through discharge chamber 58 reacts upon flow responsive disc 108 to provide a force which supplements that of compression spring 106 to maintain relief valve 72 closed under higher pressures than those at which it relieves under static or non-flow conditions. In the arrangement illustrated when the flow ranges from 10 to 15 g.p.m., valve 72 remains closed until the static pressure within discharge chamber 58 rises above 13 p.s.i. Since this 13 p.s.i. pressure is less than the pressure drop through the entire unit under normal operating conditions, the relief bypass to suction is maintained closed while the pump operates up to full output.

Relief valve 72 prevents any abnormal pressure build ups from any source by relieving to suction regardless of the conditon of check valve 70. Nozzle valve 74 can, therefore, be slammed shut without the danger of damaging hammer, and expansion of fluid trapped within a shut down pump is routinely relieved to the source of supply without wastting any of it or venting flammable or explosive vapors.

What is claimed is:
1. A relief and check valve arrangement for a rotary pump comprising a casing, suction and discharge chambers within said casing, a bypass chamber having a wall in common with both said suction and discharge chambers, said bypass chamber communicating with said discharge chamber through check and relief ports in said wall, an inlet opening to said bypass chamber for connecting it to a supply of fluid, a check valve mounted upon said check port for preventing backflow from said suction chamber to said bypass chamber and a pressure relief valve mounted upon said relief port and completely accommodated between said discharge and said bypass chambers to permit pressure to be relieved from said discharge chamber into said bypass chamber when it rises above the setting of said pressure relief valve.

2. An arrangement as set forth in claim 1 wherein said bypass chamber has a port external of said inlet opening, said port being disposed in line with said check port in said wall, and a plug in said bypass chamber port to provide access to said check valve.

3. A relief valve arrangement for a rotary pump comprising a casing, a discharge chamber within said casing, a relief port in a wall of said discharge chamber, a pressure relief valve mounted upon said relief port, said pressure relief valve including means to permit pressure to be relieved from said discharge chamber when it rises above the setting of said pressure relief valve, said means including a stem extending into said discharge chamber, a flow responsive means mounted upon said stem within said discharge chamber, and said flow responsive means having a surface which reacts in response to a dynamic flow of fluid across it to provide a force which maintains said relief valve closed at pressures higher than those existing under non-flow conditions thereby increasing the setting at which said relief valve opens under flow conditions in comparison to non-flow conditions.

4. An arrangement as set forth in claim 3 wherein said flow responsive means comprises a disc, and a compression spring reacts between said disc and said wall of said discharge chamber.

5. An arrangement as set forth in claim 4 wherein a bypass chamber communicates with said discharge chamber, said disc comprising a substantially flat circular disc having a dished center, and said disc being mounted with a generous clearance within a cylindrical passageway disposed between said discharge and bypass chambers.

6. An arrangement as set forth in claim 5 wherein said stem extends through said wall, and a resilient ball is mounted upon said stem within said bypass chamber for sealing said relief port in said wall through which said stem extends.

References Cited in the file of this patent
UNITED STATES PATENTS

| | | |
|---|---|---|
| 1,913,128 | Peter | June 6, 1933 |
| 2,845,085 | Robbins | July 29, 1958 |
| 2,886,058 | Horton | May 12, 1959 |
| 2,971,470 | Wein | Feb. 14, 1961 |
| 3,044,484 | Dunning | July 17, 1962 |